United States Patent Office 3,618,295
Patented Nov. 9, 1971

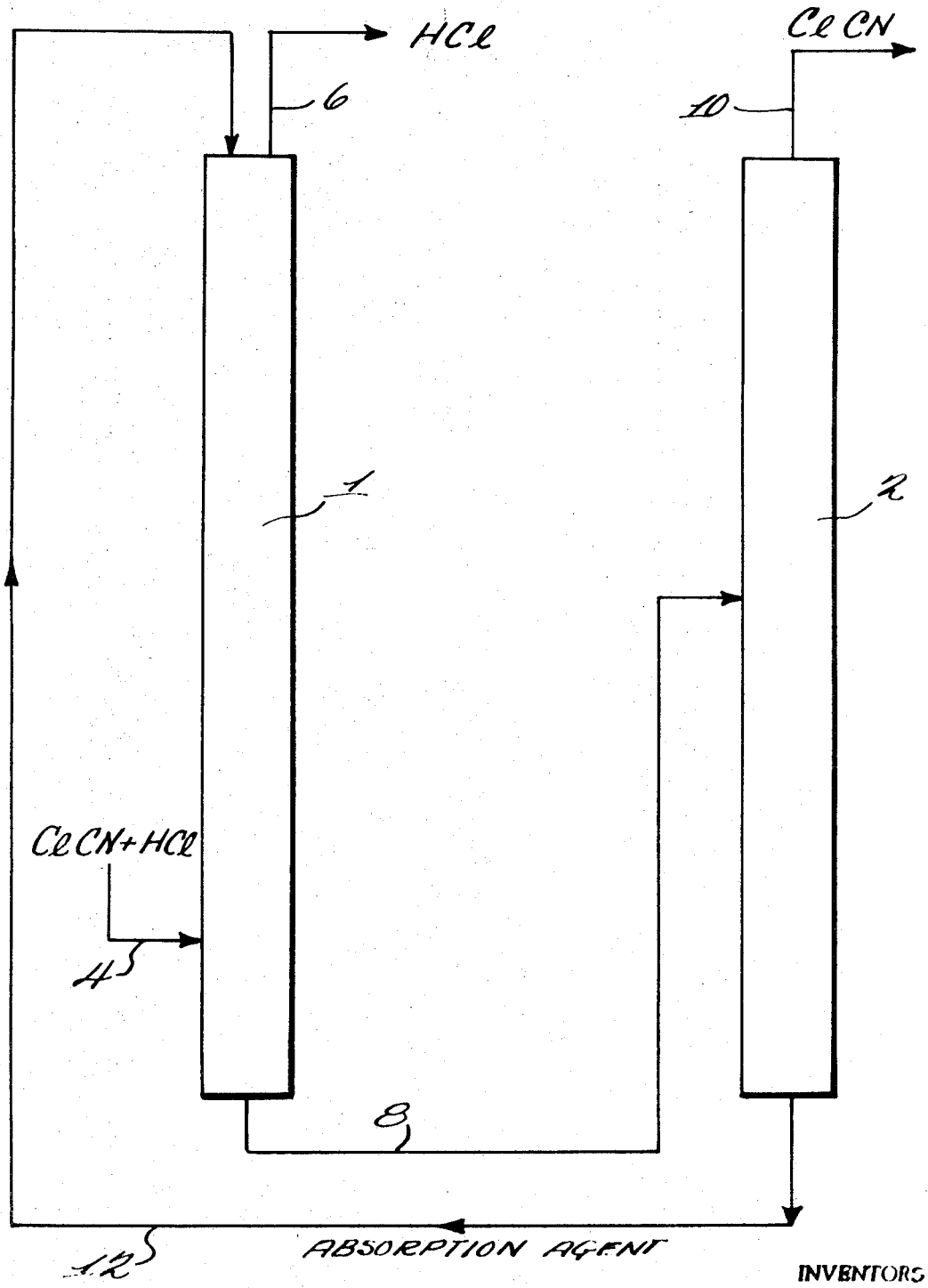

3,618,295
PROCESS FOR THE SEPARATION OF CYANOGEN CHLORIDE AND HYDROGEN CHLORIDE
Friedhelm Geiger, Offenbach am Main, Theodor Lüssling, Grossauheim, and Wolfgang Weigert, Offenbach am Main, Germany, assignors to Deutsche Gold- und Silber-Scheideanstalt vormals Roessler, Frankfurt am Main, Germany
Filed Nov. 14, 1969, Ser. No. 876,736
Claims priority, application Germany, Nov. 19, 1968, P 18 09 607.6
Int. Cl. B01d 53/16
U.S. Cl. 55—71           10 Claims

ABSTRACT OF THE DISCLOSURE

A mixture of cyanogen chloride and hydrogen chloride is separated by means of organic liquid in which the cyanogen chloride is absorbed but in which the hydrogen chloride is insoluble.

---

The invention is concerned with a process for the separation of mixtures of cyanogen chloride and hydrogen chloride. The object of the invention is to recover both materials simultaneously in suitable form for further use.

It is known to produce cyanogen chloride by the action of chlorine on hydrogen cyanide. The reaction is carried out either in the gas phase (Chemical Abstracts vol. 15 (1921) page 2593) or in aqueous solution (U.S. Pat. 1,588,731 and German Pat. 827,358 (U.S. Pat. 2,672,398)).

In the reaction hydrogen chloride is formed in addition to the cyanogen chloride in accordance with the equation $HCN + Cl_2 \rightarrow CNCl + HCl$.

Through the different solubility of these materials in water there results in the reaction in aqueous solution forced separation of cyanogen chloride escapes as a gas while hydrogen chloride forms hydrochloric acid. In a corresponding manner a water wash can be used to separate the two components of the cyanogen chloride hydrogen chloride mixture formed in the gas phase reaction.

A disadvantage in the separation of the mixture with water is that the hydrogen chloride is recovered only as dilute hydrochloric acid, a form unsuitable for technical purposes. To produce concentrated solutions of hydrochloric acid is prohibited since thereby the hydrolysis of cyanogen chloride to ammonium chloride and carbon dioxide is promoted and consequently the yield of cyanogen chloride would be reduced. Besides the hydrochloric acid would be contaminated by the ammonium chloride formed (Canadian Journal of Research, vol 25 (1947) pages 430–439).

It is also known to separate off the hydrogen chloride from the cyanogen chloride-hydrochloric acid mixture by conversion into calcium chloride by means of calcium carbonate, in a given case in the presence of water (Chemical Abstracts, vol. 15 (1921) page 2593 and U.S. Pat. 2,391,490).

By the mentioned processes in each case the hydrogen chloride is separated off from the mixture. Only the cyanogen chloride is recovered, the hydrogen chloride is discarded as dilute hydrochloric acid or calcium chloride. Processes of separation wherein besides the cyanogen chloride at the same time the hydrogen chloride is also obtained in technically useful form have not been known.

There has now been found a process for the absorptive separation of mixtures of cyanogen chloride and hydrogen chloride by means of a liquid which is characterized in that for separation and at the same time recovery of these two materials the known processes of separation are reversed and the cyanogen chloride is removed from the mixture by absorption.

In this manner it is possible to separate mixtures of cyanogen chloride and hydrogen chloride in any proportions, especially the mixture arising from the gas phase reaction of hydrogen cyanide with chlorine. An especial advantage over the known methods of separation by water is that the hydrogen chloride can be supplied to many useful purposes since it accumulates as a gas.

According to the process of the invention the cyanogen chloride-hydrogen chloride gaseous mixture is washed with organic solvents. The hydrogen chloride remains in gaseous form, the cyanogen chloride is taken up by the solvent and can be recovered from this, for example, by distillation or desorption by means of suitable foreign gases.

The mixture to be separated can contain incidental small amounts of hydrogen cyanide and chlorine if the reaction gases from the chlorination of hydrogen cyanide are dealt with. The separation of cyanogen chloride and hydrogen chloride is not affected by such impurities, however, in this case the cyanogen chloride recovered contains chlorine and the hydrogen chloride contains hydrogen cyanide. While the chlorine impurity in cyanogen chloride for most useful purposes is without importance, especially for the production of cyanuric chloride, generally it is necessary to purify the hydrogen chloride from hydrogen cyanide before further use. This occurs in known manner by treatment of the hydrogen chloride gas in the wet or dry way with ferrous salts, whereby the hydrogen cyanide is bound in the form of iron cyanide complexes.

As absorption agents for the carrying out of the process of the invention there are suitable all organic solvents in which cyanogen chloride has good solubility and hydrogen chloride has very little solubility. Especially suitable are alkyl benzenes, for example, those having side chains of 8 to 12 carbon atoms and their mixtures, as well as alkanes having boiling points between 200 and 300° C., in a given case admixed with naphthalene. Examples of hydrocarbons of the types mentioned are octylbenzene, nonylbenzene, dodecylbenzene, dodecane, tetradecane, pentadecane, hexadecane, octadecane, undecane, t-butylbenzene, butylbenzene, 1,3,5 - triethylbenzene, xylene, toluene, decane and octane. Especially suitable also are halohydrocarbons, for example chlorohydrocarbons, e.g., aliphatic compounds such as carbon tetrachloride, 1,1,2 - trichloroethylene, 1,1,1,2 - tetrachloroethane, pentachloroethane, 1,2,3-trichloropropane, 1,2-dichlorobutane, 2,3-dichlorobutane, tetrachloroethylene, hexachlorobutadiene-1,3, ethylene dichloride, ethylene dibromide, bromoform, aromatic halohydrocarbon such as chlorobenzene, 1,2-dichlorobenzene, 1,2,4-trichlorobenzene, bromobenzene, o-chlorotoluene, o-bromochlorobenzene, fluorochlorohydrocarbons such as 1-fluoro-1,2,2-trichloroethane, 1-fluoro-1,1,2,2-tetrachloroethane, liquid poly(trifluorochloroethylene).

Desirably the solvent is inert to cyanogen chloride or hydrogen chloride under the conditions of separation.

The absorption is carried out depending on the type of gas mixtures and the solvents used, under normal conditions or under moderately lowered or elevated temperature and/or increased pressure. As a temperature range, there can be used —20° C. to +100° C., preferably —20° C. to +60° C., as pressure 0.5 to 10 atmospheres, preferably 1 to 5 atmospheres.

The process is carried out suitably in continuous manner.

The invention will be understood best in connection with the drawings wherein the single figure illustrates a suitable arrangement for carrying out the process.

Referring more specifically to the drawing, an organic solvent is fed into the top of absorption column 1. The gas mixture (cyanogen chloride and hydrogen chloride) to be separated is preferably fed into the lower third of the column, e.g., through conduit 4. The hydrogen chloride gas escapes from the top of the column through conduit 6; the solvent laden with cyanogen chloride is drawn off from the bottom of the column via conduit 8. Preferably to free the liquid running down the column from entrained hydrogen chloride the lowermost portion of the column is heated while the uppermost portion of the column is cooled if necessary, depending on the solvent used, to procure a solvent free hydrogen chloride. The cyanogen chloride containing solvent which leaves the absorption column 1 via conduit 8 is fed to a distillation column 2 where it enters preferably in the middle. The cyanogen chloride is taken off the top of this column either partially condensed and gaseous or is completely condensed and taken off as liquid via conduit 10. The pure solvent running off the sump of column 2 is recycled back to the top of absorption column 1 by way of conduit 12.

EXAMPLE 1

To the top of an absorption column filled with packing material at room temperature and standard pressure there were introduced hourly 19.8 kilograms (13.7 liters) of 1,2,4-trichlorobenzene as an absorption agent. In the lower third of the column there were introduced hourly 20 moles (about 470 liters) of an equimolar gas mixture of cyanogen chloride and hydrogen chloride. The lower portion of the column was heated. The liquid running out of the column at the bottom had a temperature of 50 to 80° C. and contained 3.0 to 3.2% by weight cyanogen chloride and 0.001 to 0.002% by weight hydrogen chloride. The hydrogen chloride leaving the top of the column contained neither cyanogen chloride nor absorption agent in detectable amounts.

The liquid running out of the bottom of the absorption column was led into a distillation column whose sump was heated to the boiling point of the 1,2,4-trichlorobenzene (B.P.$_{760}$ 213° C.). The cyanogen chloride separated from the top of the column contained less than 50 p.p.m. of the absorption agent. The absorption agent running out of the bottom of the column was free of cyanogen chloride and was recycled to the absorption column.

EXAMPLE 2

There were introduced hourly to the head of an absorption column filled with filler material 10.6 kilograms (6.5 liters) of tetrachloroethylene at −10° C. and standard pressure. In the lower third of the column, there were introduced hourly 20 moles (about 470 liters) of an equimolar mixture of cyanogen chloride and hydrogen chloride. The lower portion of the column was heated. The liquid running off from the bottom of the column with a temperature of 40 to 50° C. contained 5.5 to 5.6% by weight of cyanogen chloride and 0.002 to 0.003% by weight of hydrogen chloride. The hydrogen chloride leaving the top of the column contained neither cyanogen chloride nor absorption agent in detectable amounts.

The liquid leaving the bottom of the absorption column was fed to a distillation column whose sump was heated to the boiling point of the tetrachloroethylene (B.P.$_{760}$ 121° C.). The cyanogen chloride escaping from the column contained 50 to 60 p.p.m. tetrachloroethylene. The absorption agent running out of the sump of the column was free of cyanogen chloride and was recycled to the absorption column.

In the examples while the sump of the distillation column was heated to its boiling point the solvent condensed prior to the top of the column and hence as shown by the analysis of the cyanogen chloride leaving the top of the column did not introduce significant impurities into the cyanogen chloride. The heating, however, assisted the separation of the cyanogen chloride from the solvent.

For the purpose of complete separation of the absorption agent from the cyanogen chloride it is necessary to heat the absorption solution in the distillation column to boiling. One can be satisfied with a partial separation and recycle a portion of the cyanogen chloride with the absorption agent. The distillation column in this case can be operated at a lower temperature. In such a case, the separation of the cyanogen chloride can be favored by use of a vacuum. Temperature and, in a given case, vacuum are adjusted as is conventional in the art of absorption agents.

The temperature to which the solvent is heated to effect removal of the cyanogen chloride is not critical and necessarily will vary as the boiling points of the solvents vary. Generally, however, the temperature in the distillation column should be higher than that in the absorption column at equal pressure.

EXAMPLE 3

There were introduced hourly to the head of an absoption column filled with filler material 14.8 kg. (9.3 liters) of carbon tetrachloride at 5° C. and standard pressure. In the lower third of the column there were introduced hourly 20 moles (about 470 liters) of an equimolar gaseous mixture of cyanogen chloride and hydrogen chloride. The lower portion of the column was heated.

The liquid running off from the bottom of the column with a temperature of 40° to 45° C. contained 4.0 to 4.1% by weight of cyanogen chloride and 0.002 to 0.003% by weight of hydrogen chloride. The recovery of the cyanogen chloride from the liquid was accomplished by distillation in a manner corresponding to that of Example 1 or Example 2.

The hydrogen chloride leaving the top of the absorption column was free of cyanogen chloride but contained 19.8% by weight carbon tetrachloride. The carbon tetrachloride was removed from this gaseous mixture by a washing with hexachlorobutadiene. The hydrogen chloride remaining contained neither carbon tetrachloride nor hexachlorobutadiene in detectable amounts. The carbon tetrachloride was recovered from the hexachlorobutadiene in by fractional distillation.

What is claimed is:

1. A process for the absorptive separation of a mixture of cyanogen chloride and hydrogen chloride comprising absorbing the cyanogen chloride in an organic halohydrocarbon liquid solvent in which the hydrogen chloride is insoluble, separating the hydrogen chloride as a gas from said solution and then separating the cyanogen chloride from the absorbent.

2. A process according to claim 1 wherein the halohydrocarbon is selected from the group consisting of carbon tetrachloride, 1,1,2-trichloroethylene, 1,1,1,2-tetrachloroethane, pentachloroethane, 1,2,3-trichloropropane, 1,2-dichlorobutane, 2,3-dichlorobutane, tetrachloroethylene, hexachlorobutadiene-1,3, ethylene dichloride, ethylene dibromide, bromoform, chlorobenzene, 1,2-dichlorobenzene, 1,2,4-trichlorobenzene, bromobenzene, o-chlorotoluene, o-bromochlorobenzene, 1-fluoro-1,2,2-trichloroethane, 1-fluoro-1,1,2,2-tetrachloroethane and liquid poly(trifluorochloroethylene).

3. A process according to claim 1 wherein the halohydrocarbon is selected from the group consisting of carbon tetrachloride, 1,1,2-trichloroethylene, 1,1,1,2-tetrachloroethane, pentachloroethane, 1,2,3-trichloropropane, 1,2-dichlorobutane, 2,3-dichlorobutane, tetrachloroethylene, hexachlorobutadiene-1,3, chlorobenzene, 1,2-dichlorobenzene, 1,2,4-trichlorobenzene, 1-fluoro-1,2,2-trichloroethane, 1-fluoro-1,1,2,2-tetrachloroethane and liquid poly(trifluorochloroethylene).

4. A process according to claim 1 wherein the halohydrocarbon is an aliphatic halohydrocarbon.

5. A process according to claim 1 wherein the halohydrocarbon is an aromatic halohydrocarbon.

6. A process according to claim 1 wherein the halohydrocarbon is selected from the group consisting of 1,2,4-trichlorobenzene, tetrachloroethylene and carbon tetrachloride.

7. A process according to claim 1 wherein the solvent is a chlorohydrocarbon.

8. A process according to claim 1 wherein the mixture of cyanogen chloride and hydrogen chloride is fed into the lower portion of an absorption column and heat is applied to the lower portion of the absorption column to aid in driving off the hydrogen chloride from the cyanogen chloride solution.

9. A process according to claim 8 wherein the solvent is fed to the upper portion of the absorption column in counter current flow to the hydrogen chloride.

10. A process according to claim 9 wherein the cyanogen chloride solution is fed to mid portion of a distillation column and the lower portion of the distillation column is heated sufficiently to remove the cyanogen chloride from the solvent.

References Cited
UNITED STATES PATENTS

| | | | |
|---|---|---|---|
| 1,938,324 | 12/1933 | Dieterle | 23—359 |
| 2,826,545 | 3/1958 | Walpert et al. | 55—71 X |
| 2,826,546 | 3/1958 | Walpert et al. | 55—71 X |

REUBEN FRIEDMAN, Primary Examiner

R. W. BURKS, Assistant Examiner